June 21, 1949.　　　　　W. R. RAMSAUR　　　　　2,474,162
OIL COOLER HAVING AUTOMATIC BI-METAL
THERMOSTAT CONTROLLED SHUTTER
Filed June 2, 1941　　　　　　　　　　　　2 Sheets-Sheet 1
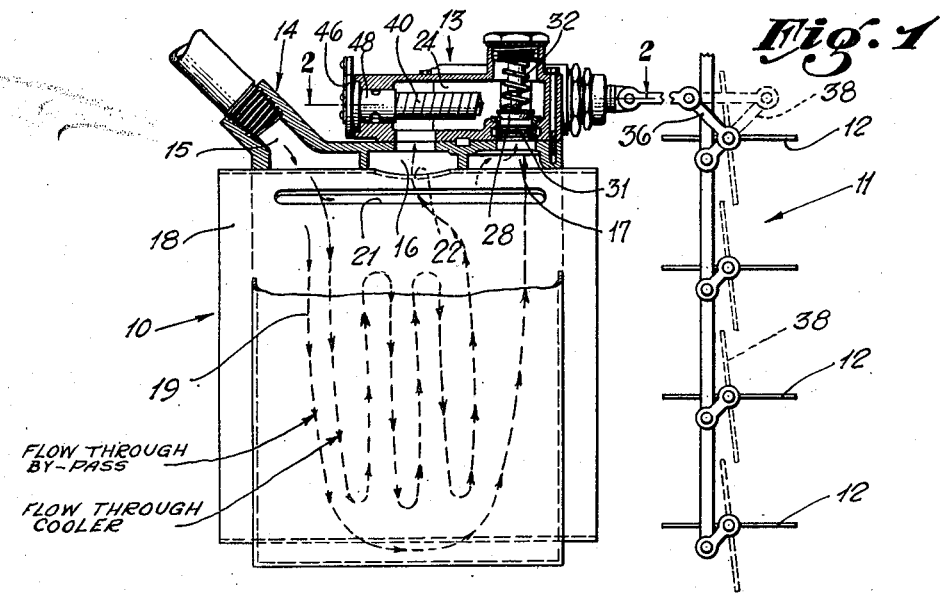
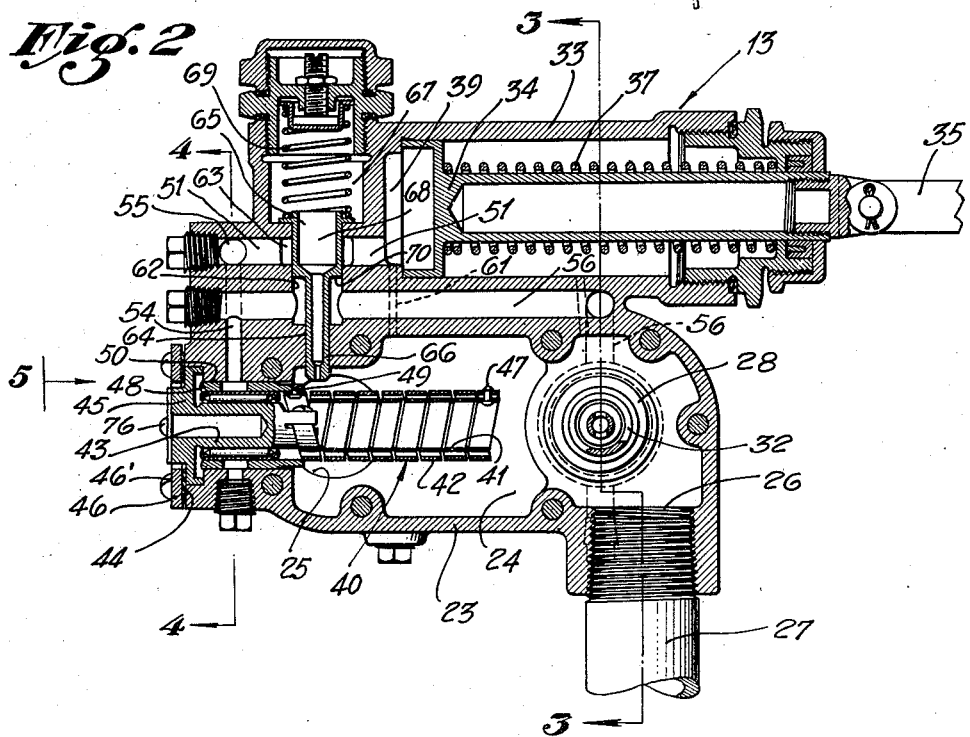
Inventor:
WALTER R. RAMSAUR,
By
Attorney.

June 21, 1949.  W. R. RAMSAUR  2,474,162
OIL COOLER HAVING AUTOMATIC BI-METAL
THERMOSTAT CONTROLLED SHUTTER
Filed June 2, 1941  2 Sheets-Sheet 2
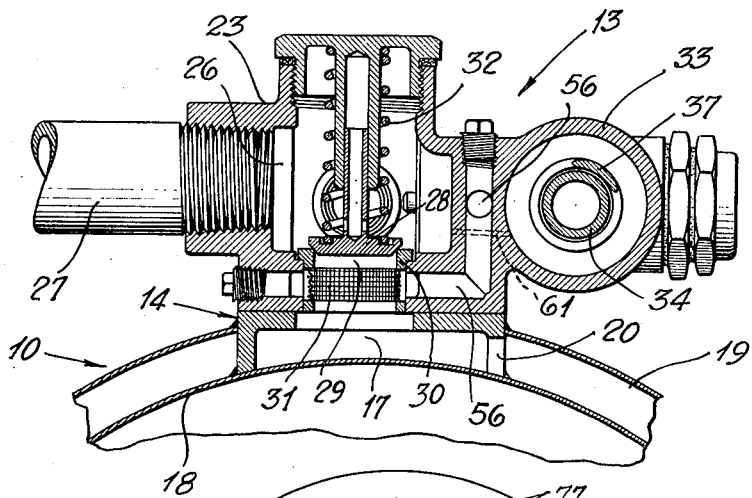
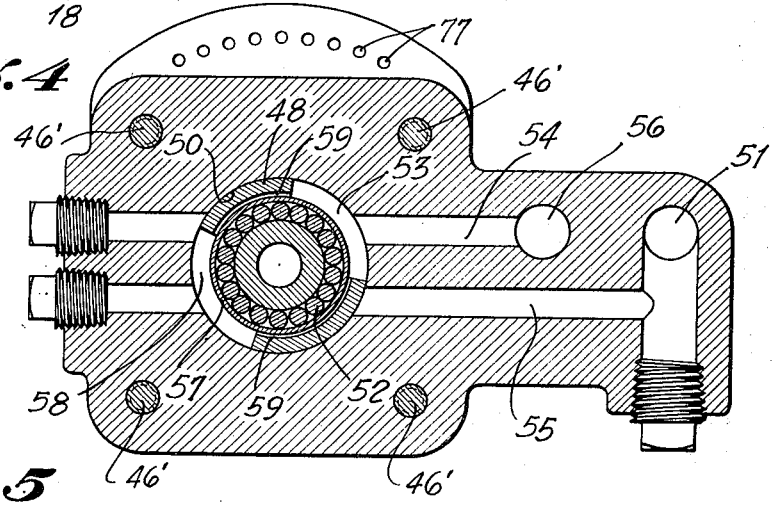
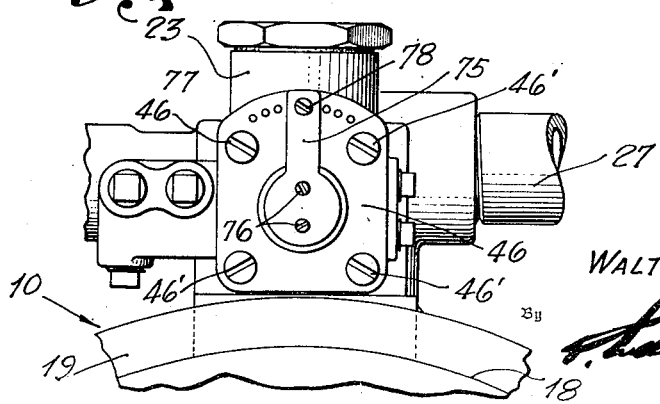
Inventor:
WALTER R. RAMSAUR,
Attorney.

Patented June 21, 1949

2,474,162

UNITED STATES PATENT OFFICE 2,474,162

OIL COOLER HAVING AUTOMATIC BIMETAL THERMOSTAT CONTROLLED SHUTTER

Walter R. Ramsaur, Los Angeles, Calif., assignor to The Garrett Corporation, Airesearch Manufacturing Company division, Los Angeles, Calif., a corporation of California Application June 2, 1941, Serial No. 396,360

16 Claims. (Cl. 236—35)

My invention relates to oil coolers of the type employed with internal combustion engines, or the like, to cool the oil which has come into contact with working or heated parts, and relates in particular to a cooling device, especially suitable for use in aircraft to cool the crankcase oil of aircraft engines.

The cooling of oil, as above indicated, serves a dual purpose. For example, in an internal combustion engine, the lubricating oil is brought into contact with heated surfaces, such as the cylinder wall and the piston, so that by cooling this lubricating oil to increase its heat absorbing capacity, the desired effect of maintaining the operating temperature of the engine within safe limits is brought nearer to attainment. The second valuable result is in maintaining the viscosity of the oil at such point that satisfactory lubricating or film-forming characteristics will be preserved in the oil. Accordingly, it is desirable in an airplane to control the temperature of the oil leaving the cooler so that in turn the temperature of the engine is in a measure controlled. This desired temperature varies with different engines, but, in general, the desired temperature of oil leaving the cooler and carried into the engine will range between 60° and 80° C.

It is an object of the present invention to provide a cooling device having spaces through which the oil to be cooled is passed and refrigerant means for absorbing heat from this oil, so that when the oil leaves the cooler, it will be very near to the desired temperature and to maintain the heat transfer means, between the flowing oil and the refrigerant, at its maximum operating efficiency.

A further object of the invention is to provide a device wherein the activity of the refrigerant means is thermostatically controlled with reference to the temperature of the oil and likewise with reference to the viscosity thereof, so that the amount of heat absorbed from the oil will bring the oil to a desired viscosity and will lower the temperature of the oil to a point within the desired range.

A further object of the invention is to provide a cooling device of the character set forth in the foregoing paragraph wherein the action of the refrigerant or heat absorbing means of the cooler is controlled by means which is sensitive to changes in condition of the oil are a measure of the lubricating qualities or viscosity of the oil, and a separate control means for the refrigerant means which acts in response to a relative increase in pressure in the oil space of the cooler or in the ducts leading to the cooler, to cause the refrigerant means to absorb a reduced quantity of heat, whereby an increase in temperature in the cooler is accomplished to thaw out the oil which by congealing within the cooler has caused a rise in pressure required to move the oil through the cooler.

A further object of the invention is to provide a cooling device of the character set forth in the preceding paragraph wherein the thaw-out control means operates in response to a pressure drop or differential caused by congealing of oil in the cooler.

Coolers for oil consist ordinarily of heat exchangers wherein the oil space is comprised of a plurality of relatively narrow passages between the inner faces of walls of thin metal arranged so that a refrigerant, normally air, may pass in engagement with the outer faces thereof. In these coolers a condition normally referred to as waxing occurs, which consists of the congealing of oil in the inner surfaces of the metal walls of the cooler so as to produce an oil coating which acts as an insulation, and which reduces the area of the oil passages to build up the reacting pressure somewhat in proportion to the reduction in cooling efficiency of the oil cooler as the congealed oil coating increases. The layers of congealed oil at times will have such insulating effect that the efficiency of heat transfer is reduced to such value that the oil flowing out of the cooler will be hot. In the preferred embodiment of my invention I provide means for controlling the operation of a shutter mechanism in association with a cooler so as to govern the temperature of the outgoing oil during normal operation of the device, and supplementary control means for periodically producing a thaw-out action within the cooler.

It is an object of the invention to provide an oil cooling device having a control element sensitive to changes in the temperature of the oil, placed so that it will be influenced by the temperature of flowing oil, for example, at some spot either within the cooler, shielded from congealing oil, or at the exit point or in the exit line somewhat remote from the cooler. It is also an object of the invention to provide in conjunction with the foregoing control means which is responsive to a drop in pressure across at least a part of the cooler.

A further object of the invention is to provide a cooling device which avoids the disadvantages resulting from a paradox in oil cooling devices. This paradox is that with an exceedingly cold refrigerant, where the optimum cooling effect might be expected, the oil cooler will lose efficiency due to the congealing or waxing of oil on the heat transfer wall, so that, instead of an efficient cooling action, the congealed layer of oil will insulate the heat transfer to such extent that very little cooling effect on the oil is obtained even though the refrigerant is at a low temperature. In the present invention a balance is maintained between the flow of refrigerant and the heated oil to maintain reasonable efficiency of the cooling action under normal conditions of operation, with an overriding or supplementary control operating in response to pressure differential to accomplish a thaw-out action when operating conditions of the cooler require the same. In the normal operation of the device, the control which is responsive to the temperature-viscosity condition of the oil, regulates the flow of the refrigerant in such a manner that an excess of refrigerating action does not normally occur so as to chill the walls of the tubes of the cooler so as to induce congealing of the oil on these tubes. It will be perceived that a principal purpose of the invention is to provide a control which under normal conditions of operation will prevent an excess flow of refrigerant through the cooler.

Further objects and advantages of the invention will be brought out in the following part of the specification.

Referring to the drawings which are for illustrative purposes only:

Fig. 1 is a partly sectioned schematic view showing a preferred form of my invention.

Fig. 2 is an enlarged sectional view taken as indicated by the line 2—2 of Fig. 1.

Fig. 3 is a cross section taken as indicated by the line 3—3 of Fig. 2.

Fig. 4 is a fragmentary section taken on a plane indicated by the line 4—4 of Fig. 2.

Fig. 5 is a fragmentary face view from the position indicated by the arrow 5 of Fig. 2.

In Fig. 1 I show an embodiment of my oil cooling device comprising a schematically shown oil cooler 10 having in association therewith refrigerant control means 11 comprising shutters 12 for controlling the flow of refrigerant, which in this instance is air, through the air spaces or tubes of the cooler 10, and a control device 13 which in turn has the function of operating the shutters 12 in accordance with conditions of viscosity, temperature and pressure and in keeping with the principles of my invention herein disclosed. The control means 13 is secured to a fitting 14 having an oil inlet chamber 15, an outlet chamber 16, and a bypass chamber 17. The fitting 14 is secured to the top of the cooler shell 18, and is arranged so that the inlet chamber 15 thereof will deliver the heated oil from the engine into the front side of the muff 19 which extends circumferentially around the shell 18 to the opposite side of the fitting 14 and is connected to the bypass chamber 17 of the fitting through a port 20, as shown in Fig. 3. Hot oil from the inlet chamber 15 may enter the shell of the cooler 10 through an inlet port 21, shown in full lines as consisting of a slot in the shell 18, and cooled oil may pass from the cooler through an opening indicated by dotted lines 22 in the upper part of the shell 18 into the outlet chamber 16 of the fitting.

As best shown in Figs. 1 and 2, the control and operating means 13 comprises a shell 23 defining an oil outlet chamber 24 having an inlet opening 25 which communicates with the outlet chamber 16 of the fitting 14, so that cooled oil from the cooler may pass from the outlet chamber 16, through the port 25 and the outlet port 24 of the device 13, to the outlet or return opening 26, connected with piping 27 for carrying the oil back to the engine. As shown in Figs. 1 to 3 inclusive, a pressure relief valve 28, of poppet type, is supported at the rightward end of the chamber 24 so as to normally close the opening 29 of a cylindrical insert 30, which, as shown in Fig. 3, carries a cylindrical screen section 31. The opening 29 communicates with the bypass chamber 17, and the valve 28 is held yieldably in closed position by a spring 32. The value of the spring 32 is such as to permit an opening of the valve 28 and a discharge of oil from the muff 19 to the outlet 26 before the pressure within the muff, due to stoppage of the flow of oil normally through the cooler, has built up to such an extent as to injure the cooler.

Adjacent the chamber 24 there is a fluid expansile device comprising a cylinder 33, slidably receiving a plunger 34 which is connected through linkage 35 with a lever 36 associated with the shutters 12 in such a manner that when the plunger 34 is moved to its leftward position by a spring 37, the shutters will be held in fully opened position, as shown in Fig. 1, and so that as the plunger is moved rightward from its position in Fig. 2, the shutters 12 will be moved toward the closed position indicated by broken lines 38, the cylinder and plunger arrangement thereby forming a fluid operated motor for actuating the shutter means 11.

It is a feature of the invention to provide means for feeding fluid under pressure to the cylinder space 39, under such control that the shutters 12 will be moved as needed in the operation of the cooler to contribute to the effect of maintaining a desired temperature and/or viscosity condition in the oil which leaves the cooler. Since there is a known relation between temperature and viscosity in the grades of lubricating oils employed in aircraft engines, this control of the shutters may be attained by use of an element sensitive to changes in viscosity or an element sensitive to changes in temperature, or otherwise stated, sensitive to a change in viscosity or temperature from a prescribed or desired value, whereby the desired conditions or qualities will be maintained in the oil. It is of course recognized that the viscosity of oil may be changed without a change in temperature, or without respect to its temperature, for example, by dilution, but with this we need not be concerned, for the reason that in engines of this type it is customary to periodically change the oil, and the pistons and the rings thereof are normally maintained in such condition that leakage of gasoline vapors past the pistons to cause oil dilution is minimized.

In the preferred form of my invention, I show a thermostat 40, as a means sensitive to changes in condition in the oil passing from the cooler, which thermostat 40 is positioned so as to project within the leftward portion of the chamber 24 in the path of flow of oil from the port 25 to the outlet opening 26 of the chambers 24. This thermostat comprises an inner helix 41 and an outer helix 42, both of which are formed from strips of bi-metallic thermostat stock. The left end of the inner helix 41 is secured to a cylindrical block or body 43 which projects from a plate 45 which is clamped rigidly in position by a screw-secured ring 46 which bears against a gasket 44. The rightward end of the inner helix 41 is connected, as by means of a rivet 47, to the rightward end of the outer helix 42, and the leftward end of the outer helix 42 is connected to a rotary, cylindrical valve 48, by means of a rivet 49. The valve 48 is supported by a needle bearing 52 on the body 43 so as to be rotatable in a bore 50 formed at the leftward end of the chamber 24, and is rotated by the thermostat 40 in a manner to control a flow of oil under pressure into the space 39 of the cylinder 33.

As best shown in Fig. 4, the valve 48 has therein a valve port 53 arranged, upon rotation of the valve in clockwise direction, to connect a pressure port 54 with the mouth of a passage 55 with a passage 51, which leads to the chamber 39. The port 54 connects with the passage 56 arranged to receive oil under pressure from the warm-up channels or muff of the cooler, the path of this passage 56 being clearly shown in Figs. 2 and 3, to receive oil under pressure through the screen 31 disposed below the bypass valve 28.

The internal end of the port 53 is closed by the outer race 57 of the needle bearing 52, and for the purpose of balancing the fluid pressure applied to the valve 48, an opening 58 is formed in the cylindrical wall of the valve 48 diametrically opposite to the port 53, and this opening 58 is connected with the port 53 by arcuate channels 59, around the outer race 57, whereby oil under pressure will be transmitted to the opening 58 and the valve 48 will be maintained floating in oil in a balanced condition so that the thermostat 40 may readily rotate the same.

A feature of the invention resides in the provision of a simple means for adjusting the thermostat valve so that it will open and close at a temperature selected in accordance with the existing conditions of operation. The plate 45 is circular and may be rotated when the pressure of the gasket 44 is released by slacking off on the screws 46' which hold the clamping ring 46. A lever 75 is secured to the plate 45 by screws 76 and arranged to traverse a portion of the ring 46 having a series of threaded openings 77 therein to receive a securing screw 78 which passes through the end of the lever 75 to hold the lever and the body 43 in the position to which the same has been adjusted. By the foregoing means, the thermostat 40 and the valve 48 may be rotated within a range of adjustment while the control device 13 is in operation, and without the necessity of dismantling the device. For example, in testing the oil cooling device under actual conditions of operation, it may be found that the oil returned to the engine is not of required temperature. While the operation of the device is continued, the adjustment of the thermostat may be quickly made, and the results of the adjustment checked.

The operation of the control means described in the preceding paragraph is substantially as follows. Should the temperature of the oil passing through the chamber 24 recede, the thermostat 40 will rotate the valve 48 so as to increase the flow of oil through the passage 51 into the space 39 of the cylinder 33. The space 39 is connected to the outlet chamber 24 through a relatively slender passage 61 through which oil may bleed from the chamber 39. The flow of oil through the passage 61 will vary in accordance with two separate factors. The flow through the passage 61 will rise and fall in accordance with the rise and fall of pressure in the chamber 39, and also the flow of oil through the passage 61 will rise and fall with relation to the decrease and increase in the viscosity of the oil. Accordingly, the following conditions will prevail. Assuming that the plunger is in the position in which it is shown in full lines in Fig. 2, and the flow into the chamber 39 through the passage 51 and out of the chamber 39 through the passage 61 is such as to maintain the plunger 34 in the stated position, an increase in the viscosity of the oil entering the chamber 39 will result in retarding the rate of flow of the oil out through the slender passage 61, and the volume of oil in the space 39 will increase due to the fact that its rate of inflow which is through relatively large passages and therefore substantially unaffected by an increase in viscosity will be greater than its rate of outflow through passage 61, thereby moving the plunger 34 in rightward direction until the pressure against the oil exerted by the spring 37 is sufficient to increase the outflow of oil through the passage 61 and the inflow of oil through the passage 51 to such extent that the rate of oil inflow and rate of oil outflow will again be balanced. In a like manner, decrease in viscosity of the oil will result in a reduction in the pressure of the oil in the chamber 39, and the leftward movement of the plunger, if not already in fully retracted position. The other factor involved in the control in the movement and position of the plunger 34 is that of changes in the rate of flow of oil into the cylinder space 39, resulting from the opening and closing of the valve 48. For example, the opening of the valve 48 by the thermostat 40 due to a drop in temperature in the outflowing oil which passes through the chamber 24, will result in an increased flow of oil through the passage 51 into the cylinder space adjacent the inner or left end of the plunger 34, and the plunger 34 will be forced rightward until the increase in pressure in the space 39 increases the rate of flow of oil through the bleeder passage 61 to the same value as the rate of flow of the incoming oil. Accordingly, there will be an adjustment of the plunger 34 through different positions, and a corresponding adjustment of the shutters 12, in accordance with changes in the condition of the oil flowing through the passage 24.

The supplementary control of the shutter means 11 is provided as follows. A stepped bore 62 is formed in the casing 23 so as to traverse the passages 51 and 56, and to be connected to the passage 51 through an annular port 63. The inner, diametrally reduced, portion 64 of the stepped bore 62 communicates with the chamber 24. A hollow valve piston 65 is disposed in the valve bore 62, this valve piston 65 having a tubular stem 66 which passes through the reduced portion 64 of the bore 62, thereby connecting the chamber 24 with a chamber 67 which lies adjacent the far or enlarged portion 68 of the valve piston 65. A spring 69, in the chamber 67, urges the valve piston 65 into a position wherein the shoulder 70 thereof will close the port 63, or in other words, will lie between the port 63 and the fluid passage 56.

Fluid pressure in the muff 19 of the cooler 10 is transmitted through the passage 56 and is constantly applied to the face or shoulder 70 of the valve piston 65. The pressure exerted by the spring 69 is such that the valve piston will move before the pressure in the muff and in the passage 56 is sufficient to cause injury to the cooler 10, to permit a flow of fluid under pressure from the passage 56, through the port 63 and the passage 51 into the cylinder space 39, to force the plunger 34 rightward to its extreme position, wherein the shutters 12 will be moved into closed position as indicated by broken lines 38 in Fig. 1. The supply of refrigerant air will be accordingly cut off from the cooler, and the cooler will rapidly warm up to such a point that the congealed oil coating on the inner faces of the wall of the cooler will be broken down, or liquefied to such extent that free flow of oil through the cooler will be again established.

I claim as my invention:

1. In an oil cooling device of the character described, having an oil cooler with an oil inlet and an oil outlet whereby a flow of oil to be cooled may be passed through the oil space of the heat exchange zone of the cooler and shutter means for controlling a flow of air through the air space of said zone, the combination of: an expansible device having a fluid movable part connected to said shutter means to operate the same; an inlet valve connecting the interior of said expansible device with a source of fluid under pressure; means to actuate said valve so as to control the application of fluid pressure to said expansible device comprising a part exposed to oil pressure which varies in accordance with the pressure drop of oil in said oil space of said cooler and acting in response to an increase in said pressure above a prescribed value to operate said valve in such manner that said movable part will close said shutter means; and means acting when said pressure is below said prescribed value to correct the position of said shutter means as the temperature of the oil departs from a prescribed normal value and thereby return said temperature to normal value, said last named means having a thermostat exposed to the heat of oil at a selected point in the flow thereof and operating in accordance with a reduction in temperature thereof to feed oil under pressure to the interior of said expansible device.

2. In an oil cooling device of the character described, having an oil cooler with an oil inlet and an oil outlet whereby a flow of oil may be passed through the oil space of the cooler and shutter means for controlling a flow of air through the air space of said cooler, the combination of: temperature responsive control means for closing and opening said shutter means respectively as the temperature of oil in said flow of oil decreases and increases; and supplementary control means operating automatically to close said shutter means in response to a rise in the pressure of oil in said oil space of said cooler above a predetermined value.

3. In an oil cooling device of the character described, having an oil cooler with an oil inlet and an oil outlet whereby a flow of oil may be passed through the oil space of the heat exchange zone of the cooler and shutter means for controlling a flow of air through the air space of said zone, the combination of: a motor connectable to said shutter means to operate the same, said motor having a closing movement and an opening movement; temperature responsive control means for producing said closing and opening movements of said motor respectively in accordance with the decrease and increase in the temperature of oil in said flow of oil; and a separate pressure responsive control for said motor having fluid-pressure responsive connection with the interior of said cooler and operating in consequence of an increase in the pressure in said oil space of said cooler resulting from low-temperature thickening of oil therein to cause a closing movement of said motor.

4. In an oil cooling device of the character described, having an oil cooler with an oil inlet and an oil outlet whereby a flow of oil may be passed through the oil space of the heat exchange zone of the cooler and shutter means for controlling a flow of air through the air space of said zone, the combination of: temperature responsive control means for closing and opening said shutter means respectively as the temperature of oil in said flow of oil decreases and increases; supplementary control means operating automatically to close said shutter means in response to a rise in pressure of oil resulting from low-temperature thickening of oil in said oil space at a point upstream from the lower end of said heat exchange zone; and a pressure relief valve for said cooler to limit the oil pressure which may be built up therein.

5. In a control unit for an oil cooler having a hot oil inlet and a cooled oil outlet, and shutters to control the flow of a cooling medium through the cooler, the combination of: a shell having an oil chamber with an opening for connection to said cooler outlet, an outlet port for delivery of cooled oil from said chamber to oil return piping, and a bypass port for connection to said inlet, a high pressure passage communicating with said cooler inlet, a cylinder having an inlet passage, a valve bore connecting said inlet passage and said high pressure passage, a bleeder passage connecting said cylinder with said chamber, a second valve bore communicating with said chamber, a valve port connecting said second valve bore with said high pressure passage, and a valve port connecting another part of said second valve bore with said inlet passage of said cylinder; a piston in said cylinder having shutter operating means thereon; means to urge said piston inward in said cylinder; a bypass valve to normally close said bypass port; a pressure opened valve in said first valve bore adapted to obstruct the same between said high pressure passage and said inlet passage, there being means to yieldably urge said valve toward its obstructing position, and said valve being movable in response to an increase in pressure above a prescribed normal pressure in said high pressure passage resulting from a low-temperature thickening of the oil in the cooler to permit a flow of high pressure oil from said high pressure passage through said inlet passage into said cylinder; and means operating when said pressure in said high pressure passage is below said prescribed normal value to correct the positions of said shutter to compensate for the departure of the temperature from a prescribed normal value comprising a thermostat in said chamber responsive to the changes in the temperature of oil passing therethrough, and a valve body in said second valve bore movable by said thermostat, said valve body having passage means to connect said valve ports, and acting in response to decrease in the temperature of the oil to which said thermostat is subjected to increase the flow of oil from said high pressure passage through said inlet passage into said cylinder.

6. In an oil cooling device of the character described, the combination of: an oil cooler having an oil inlet and an oil outlet whereby a flow of oil to be cooled may be passed through said cooler, said cooler having a warm-up passage continuously connected to said inlet; cooling means for said cooler whereby a flow of cooling fluid may be directed through the cooler; control means for said cooling means comprising a motor for the operation of said control means, and a control for said motor actuated in accordance with increase in pressure drop of oil in at least a portion of the heat exchange zone of said cooler to accordingly diminish the flow of cooling fluid through said cooler by said cooling means; a by-pass valve operable to connect said warm-up passage to said outlet; and means responsive to the changes in condition of said oil which condition is an indication of the viscosity of said oil, to diminish the flow of cooling fluid through said cooler in response to increase in the viscosity of the oil and increase the delivery of said cooling fluid in response to decrease in the viscosity of the oil, said control means having means operating in response to an increase in said pressure drop above a prescribed value to override said condition responsive means and reduce the flow of cooling fluid through the cooler regardless of the viscosity of the oil.

7. In an oil cooling device of the character described, the combination of: an oil cooler having an oil inlet and an oil outlet whereby a flow of oil to be cooled may be passed through said cooler; cooling means for directing a cooling fluid through said cooler; control means for said cooling means comprising a fluid operated motor to convert fluid pressure and movement into an actuating movement in said control means, a valve for control of fluid to said motor to cause said control means to diminish or increase the flow of cooling fluid through said cooler and means connecting said valve to the oil space of the heat exchange zone of said oil cooler at a point upstream from the rear end of said zone and operating automatically in accordance with increase and decrease in pressure in oil in said cooler above and below a prescribed pressure to open and close said valve; and means responsive to the changes in condition of said oil which condition is an indication of the viscosity of said oil when the pressure in the cooling zone is below said prescribed pressure to diminish and increase the delivery of cooling fluid through said cooler in response to increase and decrease in the viscosity of said oil.

8. In an oil cooling device of the character described, having an oil cooler with an oil inlet and an oil outlet communicating with an oil cooling space and shutter means for controlling the flow of cooling fluid in heat exchange relation to the flow of oil, the combination of: shutter actuating means comprising an expansible device having a fluid movable part for controlling the movement of said shutter means so as to close the same in response to the expansion of said device; control means having a part responsive to the changes in the condition of the oil which condition is an indication of the viscosity of said oil, to control a flow of oil under pressure into said expansible device whereby said shutter means will be respectively moved toward closed and opened positions as the viscosity of the oil increases and decreases; a valve connecting the interior of said expansible device with a source of fluid under pressure; and means to move said valve into open position in response to the increase of the pressure drop through said cooler above a predetermined value indicating an unwanted thickening of oil in the cooler so that said expansible device will be expanded to move said shutter means toward closed position independently of the viscosity of the oil coming into contact with said responsive part of said control means.

9. In an oil cooling device of the character described, having an oil cooler with an oil inlet and an oil outlet communicating with an oil cooling space and shutter means for controlling the flow of cooling fluid in heat exchange relation to the flow of oil, the combination of: shutter actuating means comprising an expansible device having a fluid movable part for controlling the movement of said shutter means so as to close the same in response to the expansion of said device; control means having a part responsive to the changes in the condition of the oil which condition is an indication of the viscosity of said oil, to control a flow of oil under pressure into said expansible device whereby said shutter means will be respectively moved toward closed and opened positions as the viscosity of the oil increases and decreases; walls forming a stepped valve bore closed at its outer end and having its smaller portion connected to the outlet of the cooler and having a valve port in its larger portion connected to the interior of said expansible device; a hollow valve piston in said stepped valve bore having a stem of reduced diameter extending into said smaller portion of said bore, there being a shoulder on the larger portion of said valve to close said port; walls forming a passage for conducting oil from the inlet of the cooler to said shoulder of said valve so that the pressure thereof will tend to move said valve; a spring in the outer portion of said valve bore to resist movement of said valve by pressure of the oil against said shoulder, so that said valve will be moved into a position to open said port in response to an increase in the pressure drop between said inlet and said outlet indicating thickening of oil in the cooler, whereby said expansible device will expand to move said shutter means toward closed position independently of the condition of the oil coming into contact with said responsive part of said control means.

10. In an oil cooling device of the character described, having an oil cooler with an oil inlet and an oil outlet communicating with an oil cooling space and shutter means for controlling the flow of cooling fluid in heat exchange relation to the flow of oil, the combination of: shutter actuating means comprising an expansible device having a fluid movable part for controlling the movement of said shutter means so as to close the same in response to the expansion of said device; a first valve to connect said inlet to said expansible device; control means for producing expansion and contraction of said expansible device, said control means having a part responsive to changes in the condition of the oil which condition is an indication of the viscosity of the oil, for moving said valve so that a flow of oil under pressure from said inlet will be controlled so as to expand said expansible device in response to an increase in the viscosity of the oil; a second valve connecting the interior of said expansible device with a source of fluid under pressure; and means to move said second valve into open position in response to the increase of the pressure drop through said cooler above a predetermined value indicating an unwanted thickening of oil in the cooler so that said expansible device will be expanded to move said shutter means toward closed position independently of the viscosity of the oil coming into contact with said responsive part of said control means.

11. In an oil cooling device of the character described, the combination of: an oil cooler having an oil inlet and an oil outlet whereby a flow of oil to be cooled may be directed into and out of the cooler, said cooler having a warm-up passage continuously connected to said inlet; cooling means for the cooler; control means for the cooling means comprising a motor for operation of the control means, and a control for said motor responsive to changes in the condition of the oil which condition is an indication of the viscosity of said oil, said control means reducing and increasing the heat absorbing action of said cooling means respectively as the viscosity of the oil increases and diminishes; a by-pass valve operable to connect said warm-up passage to said outlet; and means responding to a pressure drop through said cooler to override said control means and reduce the heat absorbing action of said cooling means so that the cooler will warm up and thaw out oil which has thickened therein.

12. In an oil cooling device of the character described, the combination of: an oil cooler having an oil inlet and an oil outlet whereby a flow of oil to be cooled may be directed into and out of the cooler; cooling means for the cooler; control means for the cooling means comprising a motor for operation of the control means and a control for said motor including a thermostat responsive to changes in the temperature of the oil so that said control means will reduce and increase the heat absorbing action of said cooling means respectively as the temperature of said oil decreases and increases; and means responding to a pressure drop through said cooler to override said control means and reduce the heat absorbing action of said cooling means so that the cooler will warm up and thaw out oil which has thickened therein.

13. In an oil cooling device of the character described, the combination of: an oil cooler having an oil inlet and an oil outlet whereby a flow of oil to be cooled may be directed into and out of the cooler; cooling means for the cooler; control means for the cooling means comprising a motor for reducing and increasing the heat absorbing action of said cooling means respectively as the temperature of said oil decreases and increases, and a thermostat exposed to changes in the temperature of the oil and serving to produce relatively large and small rates of operation of said motor respectively in response to relatively large and small departures of the temperature of the oil from a prescribed value; and means responding to a pressure drop through said cooler to override said control means and reduce the heat absorbing action of said cooling means so that the cooler will warm up and thaw out oil which has thickened therein.

14. In an oil cooling device of the character described, the combination of: an oil cooler having an oil inlet and an oil outlet whereby a flow of oil to be cooled may be directed into and out of the cooler; cooling means for the cooler; control means for the cooling means comprising a motor for reducing and increasing the heat absorbing action of said cooling means respectively as the temperature of said oil leaving the cooler decreases and increases below and above a prescribed normal value, and a thermostat exposed to changes in the temperature of the oil leaving said cooler below and above said prescribed normal value, and serving to produce relatively large and small rates of operation of said motor respectively in response to relatively large and small departures of the temperature of the oil from a prescribed value; and means responding to a pressure drop through said cooler to override said control means and reduce the heat absorbing action of said cooling means so that the cooler will warm up and thaw out oil which has thickened therein.

15. In an oil cooling device of the character described, the combination of: an oil cooler having an oil inlet and an oil outlet whereby a flow of oil to be cooled may be passed through said cooler; cooling means for controlling a flow of cooling medium through said cooler; control means for said cooling means comprising a fluid operated motor to convert fluid pressure and movement into an actuating movement in said control means, a valve for control of fluid to said motor and means connecting said valve to the oil space of the heat exchange zone of said oil cooler at a point upstream from the lower end of said heat exchange portion and operating automatically in accordance with increase in pressure in oil in said cooler at said point to actuate said valve in a manner to produce the result of diminishing the flow of cooling medium through said cooler; and means acting in subsidiary relation to said control means to correct the rate of flow of the cooling medium as the temperature of the oil departs from a prescribed value comprising a thermostat exposed to the temperature of said flow of oil to increase and diminish the flow of the cooling medium respectively as the temperature of said flow of oil falls and rises.

16. In a system for cooling the liquid of a liquid stream, the combination of: a cooler having a liquid inlet and a liquid outlet and a liquid passage connecting the inlet and outlet; means for supplying a coolant to said cooler; motor means for adjusting said supply means to vary the rate of supply of said coolant; a thermostat responsive to the temperature of the liquid in the stream for controlling said motor means; and means additional to said thermostat and responsive solely to excessive pressure differential between said inlet and outlet due to congealing of the liquid in the cooler and consequent restriction of the liquid passage therethrough for controlling said motor means to decrease the rate of supply of said coolant.

WALTER R. RAMSAUR.

REFERENCES CITED

The following references are of record in the file of this patent:

UNITED STATES PATENTS

| Number | Name | Date |
|---|---|---|
| 1,086,794 | Taft | Feb. 10, 1914 |
| 1,228,765 | Fekete | June 5, 1917 |
| 1,286,993 | Giesler | Dec. 10, 1918 |

(Other references on following page)

13

UNITED STATES PATENTS

| Number | Name | Date |
|---|---|---|
| 1,332,615 | Doble | Mar. 2, 1920 |
| 1,526,388 | Stanley | Feb. 17, 1925 |
| 1,545,956 | Good | July 14, 1925 |
| 1,649,246 | Morrisey | Nov. 15, 1927 |
| 1,853,194 | Bogle | Apr. 12, 1932 |
| 1,864,052 | Dykeman | June 21, 1932 |
| 1,987,032 | Spence | Jan. 8, 1935 |
| 1,992,796 | Young | Feb. 26, 1935 |
| 2,134,778 | Clarke | Nov. 1, 1938 |
| 2,140,735 | Clarke | Dec. 20, 1938 |
| 2,279,285 | Worth | Apr. 7, 1942 |
| 2,288,877 | Andersen | July 7, 1942 |
| 2,291,607 | Chausson | Aug. 4, 1942 |
| 2,301,665 | Dykeman | Nov. 10, 1942 |

FOREIGN PATENTS

| Number | Country | Date |
|---|---|---|
| 232,309 | Great Britain | Apr. 14, 1925 |
| 305,052 | Germany | Oct. 18, 1919 |
| 463,313 | Great Britain | Mar. 19, 1937 |
| 495,233 | Great Britain | Nov. 9, 1938 |
| 621,750 | France | Feb. 12, 1927 |

Certificate of Correction

Patent No. 2,474,162. June 21, 1949.

WALTER R. RAMSAUR

It is hereby certified that error appears in the printed specification of the above numbered patent requiring correction as follows:

Column 2, line 1, after the word "oil" insert *which*;

and that the said Letters Patent should be read with this correction therein that the same may conform to the record of the case in the Patent Office.

Signed and sealed this 29th day of November, A. D. 1949.

[SEAL]

THOMAS F. MURPHY,
*Assistant Commissioner of Patents.*

Certificate of Correction

Patent No. 2,474,162.  June 21, 1949.

WALTER R. RAMSAUR

It is hereby certified that error appears in the printed specification of the above numbered patent requiring correction as follows:

Column 2, line 1, after the word "oil" insert *which*;

and that the said Letters Patent should be read with this correction therein that the same may conform to the record of the case in the Patent Office.

Signed and sealed this 29th day of November, A. D. 1949.

[SEAL]

THOMAS F. MURPHY,
*Assistant Commissioner of Patents.*